(12) United States Patent
Seack et al.

(10) Patent No.: US 10,081,431 B2
(45) Date of Patent: Sep. 25, 2018

(54) LOAD BEARING ELEMENT AND A METHOD FOR MANUFACTURING A LOAD BEARING ELEMENT

(71) Applicant: Airbus Operations GmbH, Hamburg (DE)

(72) Inventors: Oliver Seack, Bremen (DE); Matthias Hegenbart, Ahlerstedt (DE); Hermann Benthien, Sottrum (DE); Markus Piesker, Lueneburg (DE); Jens Rohde, Bremen (DE); Sebastian Palm, Bremen (DE); Joern Clausen, Hamburg (DE); Matthias Radny, Hamburg (DE); Ulrich Knapp, Hamburg (DE)

(73) Assignee: Airbus Operations GmbH (DE)

( * ) Notice: Subject to any disclaimer, the term of this patent is extended or adjusted under 35 U.S.C. 154(b) by 969 days.

(21) Appl. No.: 14/564,216

(22) Filed: Dec. 9, 2014

(65) Prior Publication Data

US 2016/0347464 A1     Dec. 1, 2016

(30) Foreign Application Priority Data

Dec. 20, 2013  (EP) .................................... 13198801

(51) Int. Cl.
*B64D 27/26* (2006.01)
*B60R 13/08* (2006.01)
(Continued)

(52) U.S. Cl.
CPC .......... *B64D 27/26* (2013.01); *B60R 13/0869* (2013.01); *B64C 1/403* (2013.01);
(Continued)

(58) Field of Classification Search
CPC ........ B64D 2041/002; B64D 2027/262; B64D 27/26; B60R 13/0869; B60R 13/0876; B60Y 2410/114; B23P 2700/01; B23P 2700/50; B23P 15/26; B29D 99/0003; B29D 99/0007; B29L 2031/001; B29L 2031/008; B29L 2031/30;
(Continued)

(56) References Cited

U.S. PATENT DOCUMENTS

| 4,786,015 A | 11/1988 | Niggemann |
| 4,986,495 A | 1/1991 | Stromath et al. |

(Continued)

FOREIGN PATENT DOCUMENTS

| CN | 101903244 A | 12/2010 |
| CN | 102910293 A | 2/2013 |

(Continued)

OTHER PUBLICATIONS

Chinese Office Action dated Mar. 28, 2016.
Search Report dated Apr. 8, 2014 (EP 13198801.6).

*Primary Examiner* — Matthew P Travers
(74) *Attorney, Agent, or Firm* — Lerner, David, Littenberg, Krumholz & Mentlik, LLP

(57) ABSTRACT

A load bearing element for attachment of a heat generating unit to a heat sensitive supporting structure, wherein said load bearing element includes at least one body integrally formed by additive layer manufacturing, ALM. The body is adapted to provide a controlled heat transfer from said heat generating unit to said heat sensitive supporting structure.

10 Claims, 12 Drawing Sheets

(51) Int. Cl.
*F28F 13/18* (2006.01)
*F28F 1/40* (2006.01)
*B64C 1/40* (2006.01)
*B64D 41/00* (2006.01)
*F28F 1/42* (2006.01)
*F28F 13/14* (2006.01)
*B33Y 80/00* (2015.01)
*F28D 21/00* (2006.01)
*B22F 3/105* (2006.01)
*C22C 1/04* (2006.01)

(52) U.S. Cl.
CPC ............... *B64D 41/00* (2013.01); *F28F 1/40* (2013.01); *F28F 13/185* (2013.01); *B22F 3/1055* (2013.01); *B33Y 80/00* (2014.12); *B64D 2027/262* (2013.01); *B64D 2041/002* (2013.01); *C22C 1/045* (2013.01); *C22C 1/0408* (2013.01); *F28D 2021/0021* (2013.01); *F28F 1/422* (2013.01); *F28F 13/14* (2013.01); *Y02P 10/295* (2015.11); *Y02T 50/44* (2013.01); *Y02T 50/46* (2013.01)

(58) Field of Classification Search
CPC ......... B29L 2031/3076; B32B 2605/18; B32B 2605/08; Y10T 29/49616; Y10T 29/49622; Y10T 29/4935; Y10T 29/49361; Y10T 29/49377; Y10T 29/49378; Y10T 29/49385; B33Y 10/00; B33Y 80/00; B22F 3/008; B22F 3/1055; F28F 1/422; F28F 13/14; F28F 13/003; F28F 1/006; F28F 1/10; F28F 9/20; F28F 1/40; F28F 2255/00; B29C 67/0051–67/0081
See application file for complete search history.

(56) References Cited

U.S. PATENT DOCUMENTS

| | | | |
|---|---|---|---|
| 8,371,522 B2 | 2/2013 | Piesker | |
| 9,188,065 B2 | 11/2015 | DeDe et al. | |
| 2004/0021256 A1* | 2/2004 | DeGrange | B29C 41/46 264/497 |
| 2007/0120037 A1* | 5/2007 | Martinez Rueda | B64D 27/26 248/637 |
| 2009/0008066 A1* | 1/2009 | Meng | F04D 29/582 165/104.33 |
| 2009/0260789 A1* | 10/2009 | Sperandei | F28D 1/0333 165/177 |
| 2009/0269497 A1* | 10/2009 | Yousefiani | B22F 3/1055 427/258 |
| 2011/0013402 A1* | 1/2011 | Little, Jr. | F21V 15/01 362/311.01 |
| 2011/0253878 A1* | 10/2011 | Klahn | B64C 7/00 248/636 |
| 2012/0120669 A1* | 5/2012 | McClellan | F21V 21/30 362/373 |
| 2013/0167584 A1* | 7/2013 | Sunder | F28D 9/0062 62/643 |
| 2013/0320134 A1 | 12/2013 | Bell et al. | |
| 2014/0284039 A1* | 9/2014 | Dede | F28F 13/14 165/185 |

FOREIGN PATENT DOCUMENTS

| | | |
|---|---|---|
| GB | 2 490 141 A | 10/2012 |
| JP | H06 321132 A | 11/1994 |
| WO | 02/055864 A1 | 7/2002 |

\* cited by examiner

LOAD BEARING ELEMENT AND A METHOD FOR MANUFACTURING A LOAD BEARING ELEMENT

FIELD OF THE INVENTION

The present invention relates to a load bearing element and a method for manufacturing a load bearing element which is adapted to attach a heat generating unit to a heat sensitive supporting structure.

BACKGROUND OF THE INVENTION

Additive layer manufacturing (ALM) techniques can be used in procedures for building-up three-dimensional solid objects based on a digital data model. ALM employs an additive process, where layers of material are sequentially built up in different shapes. ALM is currently used for prototyping and distributed manufacturing.

A load bearing element is a component which is adapted to carry or hold a load to a supporting structure such as a chassis of a vehicle or a fuselage of an aircraft. A load bearing element can be used for attachment of a heat generating unit to a heat sensitive supporting structure. Vehicles, in particular flying vehicles such as aircrafts, comprise heat generating units in fire safe compartments within the fuselage of the vehicle. Such aircrafts or land vehicles can comprise an auxiliary power unit APU. The auxiliary power unit is a device which provides energy functions other than propulsion. The primary purpose of an aircraft auxiliary power unit APU is to provide power to start main engines of the vehicle. The auxiliary power unit itself can be started by a battery or hydraulic accumulator. Once the auxiliary power unit is running, it provides power to start the vehicle's main engines. The power provided by the auxiliary power unit can comprise electrical, pneumatic and/or hydraulic power. The auxiliary power unit can also be used to run accessories within the vehicle while the main engines are shut down. The auxiliary power unit is a heat generating unit and is positioned within a fire resistant compartment of the vehicle. In an aircraft the auxiliary power unit APU is connected by means of at least one load bearing element to the fuselage of the aircraft. The fuselage forms a heat sensitive supporting structure whose mechanical integrity is to be maintained.

In a conventional vehicle, the heat generating unit is attached to the heat sensitive supporting structure by means of rods or brackets. These rods or brackets are manufactured from steel which forms a fire resistant material. These conventional load bearing elements can also comprise cooling ribs to reduce an energy transfer into the heat sensitive supporting structure. Load bearing elements made from steel comprise a high density and a corresponding high weight. Further, a conventional load bearing element does comprise in many applications many sub-components which are fixed together so that the manufacturing complexity of the load bearing element is relatively high.

BRIEF SUMMARY OF THE INVENTION

It is therefore an idea of the present invention to provide an improved load bearing element and a method for manufacturing such a load bearing element.

According to an aspect of the present invention, a load bearing element for attachment of a heat generating unit to a heat sensitive supporting structure is provided, wherein said load bearing element comprises at least one body integrally formed by additive layer manufacturing, ALM, said body being adapted to provide a controlled heat transfer from said heat generating unit to said heat sensitive supporting structure.

Another idea of the present invention resides in that additive layer manufacturing, ALM, or additive manufacturing, AM, technology is used when integrally forming a body of the load bearing element.

In a possible embodiment of the load bearing element, the integrally manufactured body of said load bearing element is formed such that it shields the heat sensitive structure from thermal radiation emitted directly or indirectly by said heat generating unit.

In a further possible embodiment of the load bearing element, the integrally manufactured body of said load bearing element is formed such that it transfers thermal heat received from said heat generating unit by means of a fluid moving by convection through cooling cavities and/or along cooling ribs of said integrally manufactured body to the surrounding.

In a still further possible embodiment of the load bearing element, the integrally manufactured body of the load bearing element is formed such that it spreads the thermal energy received from the heat generating unit by thermal conduction via its body to a footprint area, where the load bearing element is attached to said heat sensitive supporting structure.

In a further possible embodiment of the load bearing element, the integrally manufactured body of said load bearing element is formed such that by the controlled heat transfer a mechanical stiffness throughout said integrally manufactured body of said load bearing element and/or a mechanical stiffness of said heat sensitive supporting structure is maintained for an admissible maximum load, carried by said load bearing element and/or a maximum thermal energy generated by said heat generating unit.

In a further possible embodiment of the load bearing element, layers of the integrally manufactured body are formed such that they are adapted to absorb mechanical forces.

In a further possible embodiment of the load bearing element, the integrally manufactured body of said load bearing element comprises several layers printed from the same or different materials. The materials are preferably fire-proof materials.

In a further possible embodiment of the load bearing element, the printed layers of the integrally manufactured body of the load bearing element have different heat transport properties or other physical properties, in particular density, depending on the position of the respective printed layers relative to the heat generating unit attached by said load bearing element to said heat sensitive supporting structure.

In a possible embodiment of the load bearing element, layers of said integrally manufactured body located close to a heat impacted side in the vicinity of the heat generating unit comprise a lower thermal conductivity than layers located close to the heat sensitive supporting structure.

In a further possible embodiment of the load bearing element, layers of said integrally manufactured body located close to a heat impacted side in the vicinity of the heat generating unit provide a higher radiation shielding than layers located close to the heat sensitive supporting structure.

In a further possible embodiment of the load bearing element, a cross-section through said integrally manufactured body of said load bearing element parallel to the heat sensitive supporting structure increases towards the heat sensitive supporting structure so that the integrally manufactured body is adapted to spread the thermal energy received from said heat generating unit to an expanded footprint area of the body, where the load bearing element is attached to said heat sensitive supporting structure.

In a further possible embodiment of the load bearing element, the integrally manufactured body comprises a three-dimensional structure printed by additive layer manufacturing according to a three-dimensional bionic design data model read from a database.

In a further possible embodiment of the load bearing element, the integrally manufactured body of said load bearing element is a load bearing bracket adapted to attach the heat generating unit to a heat sensitive supporting structure of a vehicle.

In a further possible embodiment of the load bearing element, the integrally manufactured body of said load bearing element is a longitudinal body comprising a longitudinal core strut connected to a cylindrical circumferential ring via branches providing longitudinal cooling cavities.

In a further possible embodiment of the load bearing element, the integrally manufactured longitudinal body of said load bearing element comprises cooling ribs attached to the circumferential ring.

In a further possible embodiment of the load bearing element, the integrally manufactured body of said load bearing element is a longitudinal body comprising a longitudinal core strut surrounded by a porous cladding adapted to shield said longitudinal core strut from external heat.

In a further possible embodiment of the load bearing element, the heat sensitive supporting structure is a fuselage of a flying vehicle.

In a possible embodiment, the flying vehicle comprises an aircraft, a spacecraft or a helicopter.

In a still further possible embodiment of the load bearing element, the heat sensitive supporting structure is a chassis of a land vehicle.

In a further possible embodiment of the load bearing element, the heat generating unit is an auxiliary power unit, APU, mounted in a fire compartment of a vehicle.

The invention further provides according to another aspect a vehicle comprising at least one load bearing element according to the first aspect of the present invention.

Accordingly, the present invention provides a vehicle comprising at least one load bearing element for attachment of a heat generating unit to a heat sensitive supporting structure of the vehicle, wherein said load bearing element comprises at least one body integrally formed by additive layer manufacturing, ALM, said body being adapted to provide a controlled heat transfer from said heat generating unit to said heat sensitive supporting structure of said vehicle.

The invention further provides according to yet another aspect a method for manufacturing a body of a load bearing element, wherein the body is integrally formed by additive layer manufacturing such that it provides a controlled heat transfer from a heat generating unit carried by said load bearing element to a heat sensitive supporting structure to which said heat generating unit is attached by means of said load bearing element.

BRIEF DESCRIPTION OF THE DRAWINGS

For a more complete understanding of the different aspects of the present invention and the advantages thereof, exemplary embodiments of the invention are explained in more detail in the following description with reference to the accompanying drawings, in which like reference characters designate like parts and in which.

DETAILED DESCRIPTION

The accompanying drawings are included to provide a further understanding of the different aspects of the present invention and are incorporated in and constitute a part of this specification. The drawings illustrate particular embodiments of the present invention and together with the description do serve to explain the principles underlying the present invention. Other embodiments of the invention and many advantages of the invention will be readily appreciated as they become better understood with reference to the following detailed description. It will be appreciated that common and/or well-understood elements that may be useful or necessary in a commercially feasible embodiment are not necessary depicted in order to facilitate a more abstracted view of the embodiments. The elements of the drawings are not necessarily illustrated to scale relative to each other. It will further be appreciated that certain actions and/or steps in an embodiment of a method may be described or depicted in a particular order of occurrences while those skilled in the art will understand that such specificity with respect to a sequence is not necessarily required. It will also be understood that the terms and expressions used in the present specification have the ordinary meaning as is accorded to such terms and expressions with respect to their corresponding respective areas of inquiry and study, except where specific meanings have otherwise been set forth herein.

Figure 1A:
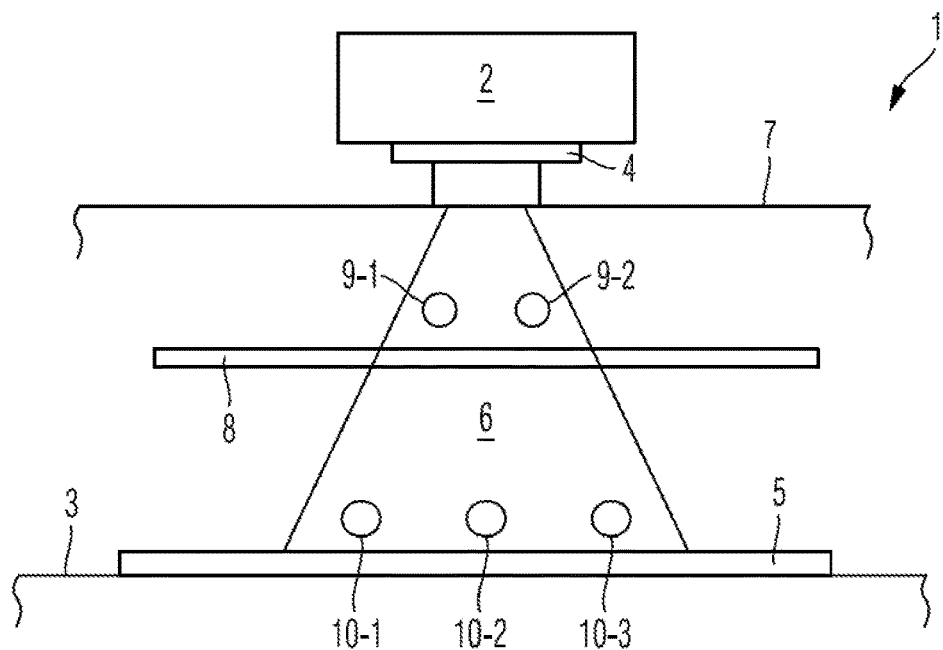
FIG. 1A shows a schematic illustration of an exemplary embodiment of a load bearing element according to an aspect of the present invention.
Figure 1B:
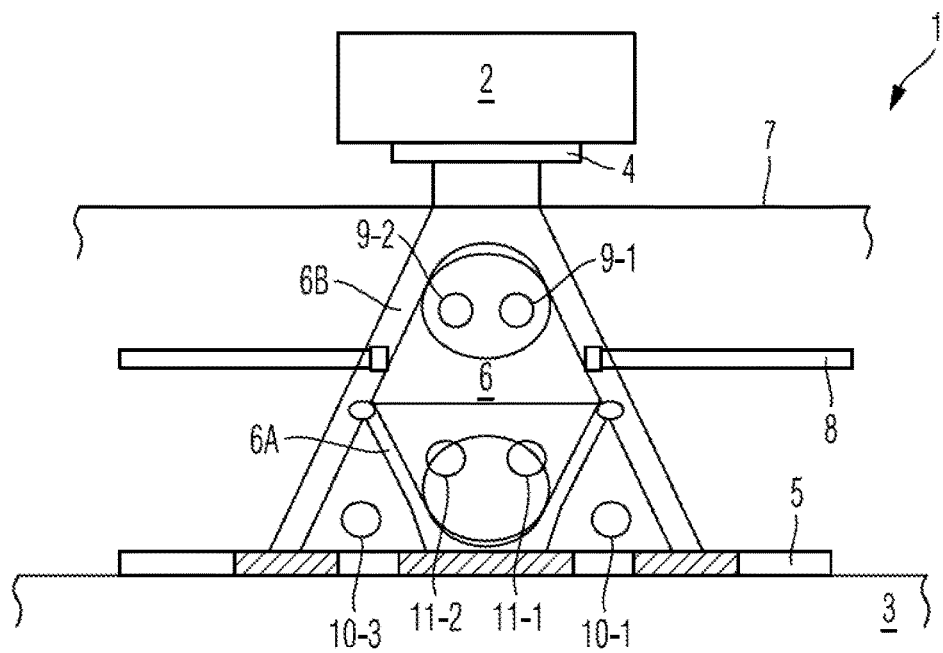
FIG. 1B shows a schematic cross-section view of the load bearing element of FIG. 1A.

With reference to FIGS. 1A, 1B of the drawings, an exemplary embodiment of a load bearing element 1 according to an aspect of the present invention is schematically shown. In the shown exemplary embodiment, the load bearing element 1 is provided for attaching a heat generating unit 2 such as an auxiliary power unit, APU, to a heat sensitive supporting structure 3, in particular a fuselage of an aircraft. In other possible embodiments the heat generating 2 can also be formed by an engine or motor with elevated temperature due to a fire or due do another malfunctions of engine itself or another entity. The engine or motor can also be located in a fire compartment with an elevated temperature. In the shown exemplary embodiment, the load bearing element 1 comprises at least one body 6 integrally formed by additive layer manufacturing, ALM. The body 6 of the load bearing element 1, as shown in FIGS. 1A, 1B, is adapted to provide a controlled heat transfer from the heat generating unit 2 to the heat sensitive supporting structure 3. The heat generating unit 2 can be an auxiliary power unit, APU, positioned in a fire compartment of an aircraft. The heat sensitive supporting structure 3 can be formed by a fuselage of an aircraft.

The load bearing element 1 comprises an APU interface platform 4 fixing the heat generating unit 2 to the load bearing element 1. Further, the load bearing element 1 comprises a flange 5 to connect the load bearing element 1 to the heat sensitive supporting structure 3. The load bearing element 1 further comprises a body 6 integrally formed by additive layer manufacturing, ALM. In a possible embodiment, the APU interface platform 4 and the flange 5 can also form part of the integrally formed body 6. The body 6 is adapted to provide a controlled heat transfer from the heat generating unit 2 to the heat sensitive supporting structure 3.

The body 6 of the load bearing element 1 is formed such that it shields the heat sensitive structure 3 from a thermal radiation emitted directly or indirectly from said heat generating unit 2. In the embodiment shown in FIG. 1A, a firewall 7 is provided separating the heat generating unit 2 from the surrounding. The heat generating unit 2 can be positioned within a fireproof compartment comprising the firewall 7. In the shown exemplary embodiment, the body 6 comprises at least one cooling rib 8 which is arranged in parallel to the firewall 7. The cooling rib 8 is provided for cooling by convection, wherein a fluid is moving along the cooling rib 8 to transfer heat or thermal energy to the surrounding. In the embodiment shown in FIG. 1A, the cooling rib 8 also provides a shielding of the heat sensitive structure 3 from thermal radiation emitted from the firewall 7. The cooling rib 8 can absorb the thermal radiation and can partially reflect it.

In the shown exemplary embodiment, the body 6 further comprises ventilation holes 9-1, 9-2 in a space between the firewall 7 and the cooling rib 8 as illustrated in FIG. 1A. The body 6 further comprises ventilation holes 10-1, 10-2, 10-3 in a space between the cooling rib 8 and the heat sensitive supporting structure 3. The ventilation holes 9-$i$ and 10-$i$ allow a fluid to enter and to leave internal cavities of the body 6. In this way, heat convection can be provided by a fluid comprising a gas or a liquid, wherein thermal energy is transported along with the flow of matter in the moving fluid. In the shown embodiment of FIGS. 1A, 1B, the fluid is formed by a gas, in particular surrounding air. The flow of the fluid through the cooling cavities of the body 6 of the load bearing element 1 can be forced by external processes or buoyancy forces caused when thermal energy expands the fluid (natural convection). In an alternative embodiment, the fluid is forced through the cooling cavities of the body 6 of the load bearing element 1 by use of a pump fan or any other mechanical means.

FIG. 1B shows a cross-section view through the load bearing element 1 illustrated in FIG. 1A. As can be seen in FIG. 1B, the integrally formed body 6 of the load bearing element 1 comprises in the shown embodiment an inner cone 6A placed within an outer cone 6B of the body 6. The ventilation openings 9-1, 9-2 connect the inner volume of the outer cone 6B with the surrounding space between the firewall 7 and the cooling rib 8. The ventilation holes 10-$i$ connect the inner volume of the outer cone 6B with the surrounding space between the cooling rib 8 and the heat sensitive supporting structure as shown in FIG. 1B. The inner cone 6A has interior ventilation openings 11-1, 11-2 which allow the fluid which has entered through the lower ventilation holes 10-$i$ to pass through and to exit via the upper ventilation holes 9-$i$ as illustrated in more detail in FIG. 2. The fluid in the compartment between the flange 5 and the cooling rib 8 has a lower temperature than the fluid between the cooling rib 8 and the firewall 7. This allows a natural convection of the fluid from the lower compartment close to the heat sensitive supporting structure 3 to the upper compartment between the cooling rib 8 and the firewall 7 in the vicinity of the heat generating unit 2. As can be seen from FIG. 2, the integrally manufactured body 6 which comprises the inner cone 6A and the outer cone 6B is adapted to transfer thermal energy received from the heat generating unit 2 by means of a fluid moving by convection through cooling cavities and cooling ribs of the integrally manufactured body 6 to the surrounding. The manufacturing of the cooling body 6 having a complex geometry including cones 6A, 6B by ALM allows the form a body 6 such that it provides a controlled heat transfer from the heat generating unit 2 to the heat sensitive supporting structure 3. In a possible embodiment, the cooling rib 8 can also form part of the body 6 manufactured by additive layer manufacturing, ALM.

Figure 3:
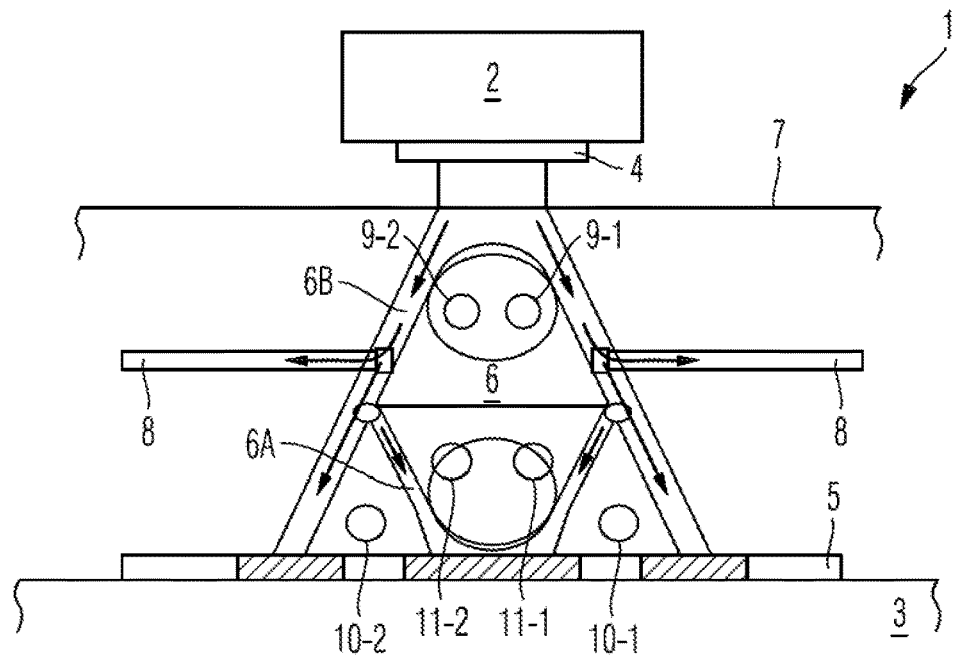
FIG. 3 shows a further schematic diagram for illustrating the load bearing element of FIG. 1A.

FIG. 3 further illustrates the spreading of the thermal energy through the integrally manufactured body 6 by means of thermal conduction. The heat stream originating from the APU interface platform 4 flows through the wall of the outer cone 6B into the cooling rib 8 and further branches off into the walls of the inner cone 6A to reach finally the flange 5 connecting the load bearing element 1 with the heat sensitive supporting structure 3. In this way, thermal energy is spread from the heat generating unit 2 by thermal conduction via different parts of the integrally manufactured body 6 of the load bearing element 1 to a footprint area 12-1, 12-2, 12-3, where the load bearing element 1 is attached to the heat sensitive supporting structure 3.

As can be seen from the exemplary embodiment illustrated in FIGS. 1A, 1B, 2, 3, the integrally manufactured body 6 of the load bearing element 1 is formed such that it provides a controlled heat transfer by heat conduction, by heat convection and by shielding against thermal radiation. The cooling rib 8 which may form part of the body 6 shields the heat sensitive structure 3 from thermal radiation emitted from the firewall 7 receiving thermal energy from the heat generating unit 2. Further, cooling cavities within the complex body 6 and the cooling ribs 8 transfer thermal energy received from the heat generating unit 2 by heat convection when a fluid such as air moves through internal cooling cavities and/or along internal cooling ribs of the body 6 to transfer the heat to the surrounding. Further, as illustrated in FIG. 3, the integrally manufactured body 6 spreads thermal energy from the heat generating unit 2 by thermal conduction to the footprint area, where the load bearing element 1 is attached to the heat sensitive supporting structure 3.

Figure 2:
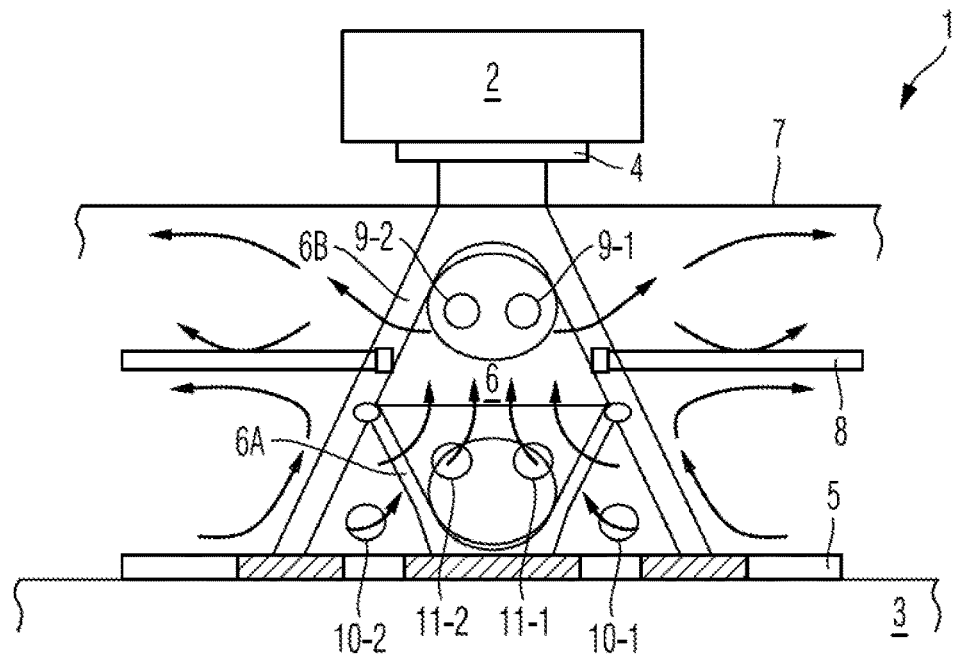
FIG. 2 shows a further schematic diagram for illustrating the load bearing element of FIG. 1A.

In the embodiment shown in FIGS. 1, 2, 3, thermal shielding is provided by the cooling and shielding rib 8. Accordingly, the cooling rib 8 has in the shown exemplary embodiment several functions, i.e. the function to protect the heat sensitive supporting structure 3 from thermal radiation and, at the same time, the function to provide cooling by heat convection as shown in FIG. 2. As a further function, the cooling rib 8 can also absorb thermal energy received from the wall of the external cone 6B through heat conduction as illustrated in FIG. 3. In the shown embodiments, the load bearing element 1 comprises one cooling rib 8. In other embodiments, several cooling ribs 8 can be provided positioned in parallel to each other between the firewall 7 and the heat sensitive supporting structure 3. The conduction or diffusion transfers heat or thermal energy between objects that are in physical contact. The heat convection transfers the heat or thermal energy from one place to another by the movement of a fluid. The thermal radiation emitted by the firewall 7 is energy emitted as electromagnetic waves. By manufacturing the body 6 with additive layer manufacturing, ALM, techniques, it is possible to provide a complex external and internal geometry or form such that the heat transfer from the heat generating unit 2 to the heat sensitive supporting structure 3 is performed in a controlled manner using different heat transfer mechanisms, in particular heat conduction, heat convection and shielding against thermal radiation.

In a possible embodiment of the integrally manufactured body 6 of the load bearing element 1, the body is formed such that by controlled heat transfer a mechanical stiffness of the body 6 of the load bearing element 1 and a mechanical stiffness of the heat sensitive supporting structure 3 is maintained at all operation conditions, in particular when a load less than an admissible maximum load is carried by the load bearing element 1 and/or energy less than an admissible maximum thermal energy is generated by the heat generating unit 2. The heat generating unit 2 can be an auxiliary power unit, APU, of an aircraft providing a thermal energy at a temperature T of e.g. 1100° C. at a rate of 116 kW/m$^2$ in case of failure.

The integrally manufactured body 6 of the load bearing element 1 does comprise several layers which are printed from the same or different fire resistant or fire proof materials. In a possible embodiment, the layers of the body 6 are printed to provide a three-dimensional solid object of a shape corresponding to a digital data model. In a possible embodiment, the body 6 comprises a three-dimensional structure printed by additive layer manufacturing, ALM, according to a three-dimensional bionic design data model read from a database. In a possible embodiment, the manufacturing machine reads the design data model from a database and lays down successive layers of liquid, powder, paper or sheet material to build the body 6 from a series of corresponding cross-sections. These layers correspond to the virtual cross-sections from the data model and are joined or automatically fused to create the final shape of the three-dimensional body 6. In a preferred embodiment, the layers are formed by a fire proof material. The materials can comprise a metal, a metal alloy or thermoplastics. The materials can comprise in particular steel, titanium or inconel. The additive layer manufacturing, ALM, process can be performed by using Fused Deposition Modelling (FDM), electron beam free form fabrication, direct metal laser sintering, selected laser sintering or other additive layer processes. The manufacturing process can comprise a process where layers of powder are consolidated using a laser or electron beam to fuse scans of the slice computer aided design data to create the geometrical form of the body 6. Alternatively, material deposition or extrusion processes can be employed by heating the material through an extrusion nozzle which follows a predefined deposition path to deposit material on top of previous layers to create the three-dimensional geometry of the body 6. For metal, blown powder and wire extrusion can be used, wherein the material can be melted by using a laser or electron beam. In a preferred embodiment, the body 6 of the load bearing element 1 is printed in steel, titanium or inconel. By manufacturing the body 6 by means of additive layer manufacturing, ALM, any desired kind of shape providing the desired heat transfer control can be manufactured wherein an increased complexity of three-dimensional structure of the body 6 does not increase the manufacturing time and effort significantly. By manufacturing the body 6 with additive layer manufacturing, ALM, different functions by a single part can be provided as illustrated in the embodiment shown in FIGS. 1, 2, 3. In a possible embodiment the load bearing element 1 comprises a framework built from rods. The used rods can be integrated rods or rods with integral rotary pin ends. The rods of the load bearing element 1 can be manufactured by using additive layer manufacturing, ALM, techniques. The load bearing element 1 can be manufactured out of Aluminium Magnesium Scandium alloy as this material can withstand higher thermal loading than most of the other airframe aluminium alloys. Furthermore, the part can be manufactured by a combination of semi-finished product or profile with ALM.

Figure 4A:
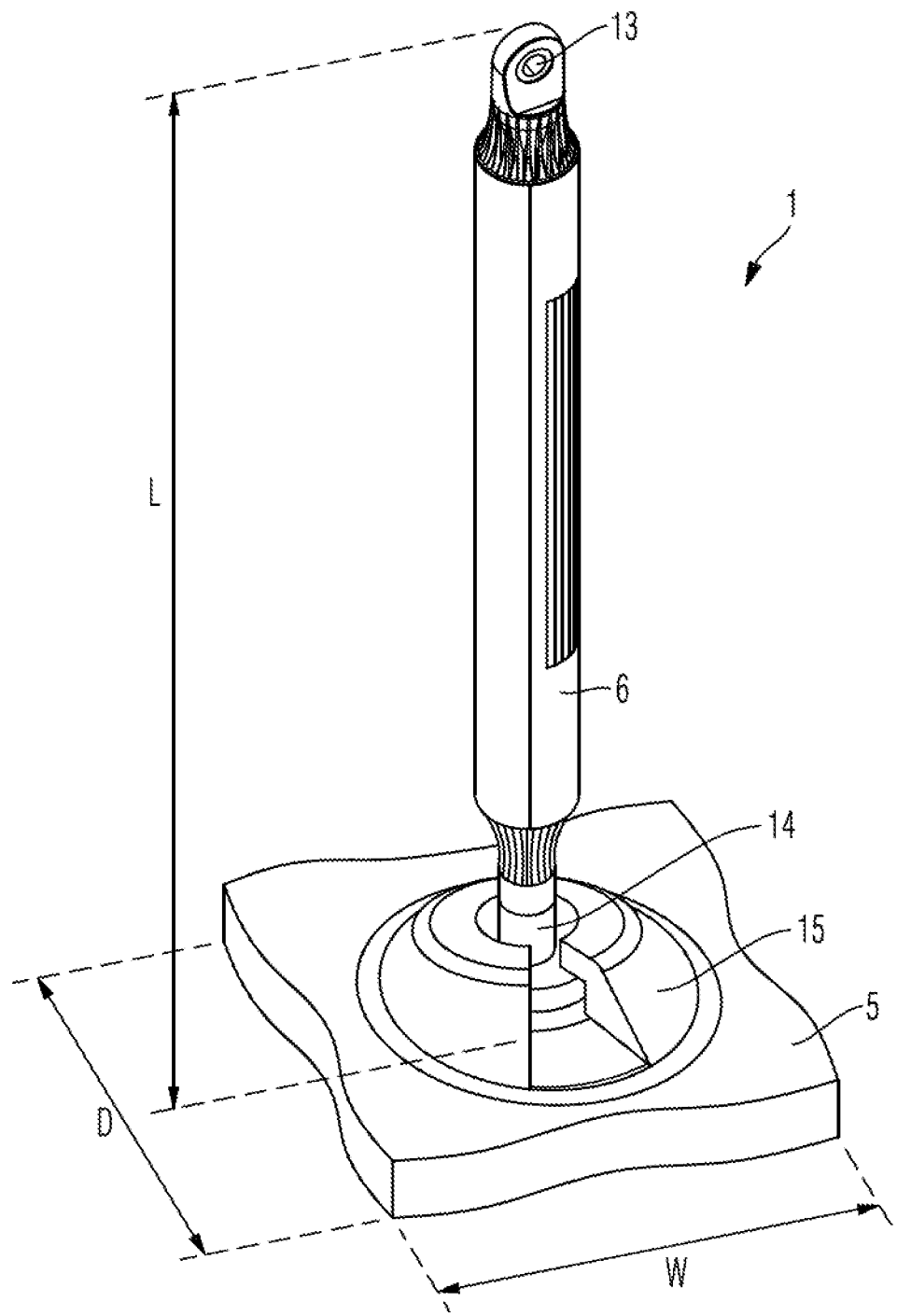
FIGS. 4A, 4B, 4C illustrate a further exemplary embodiment of a load bearing element according to an aspect of the present invention.
Figure 4B:
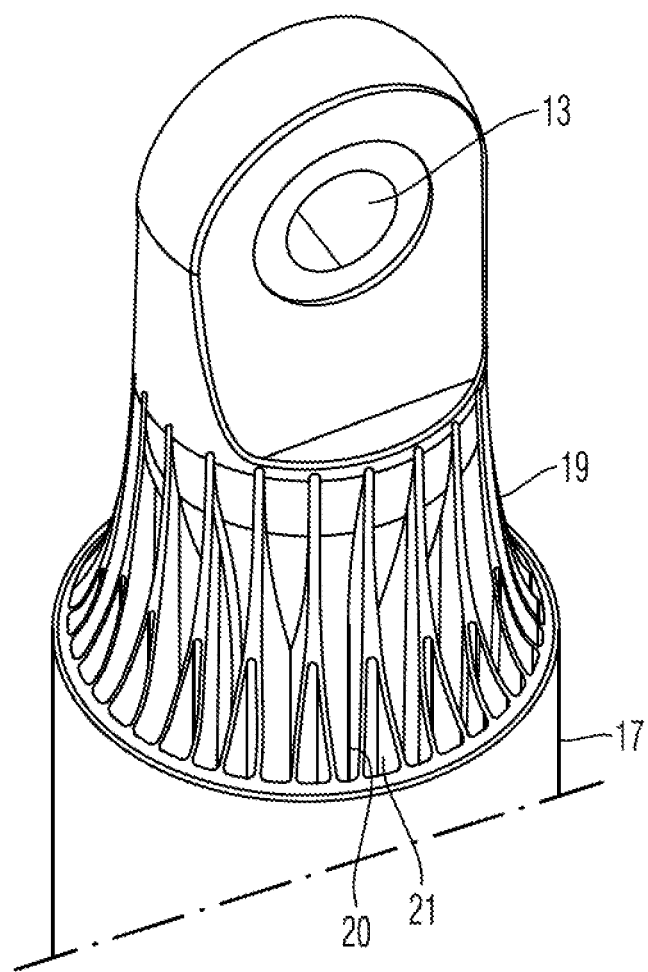
Figure 4C:
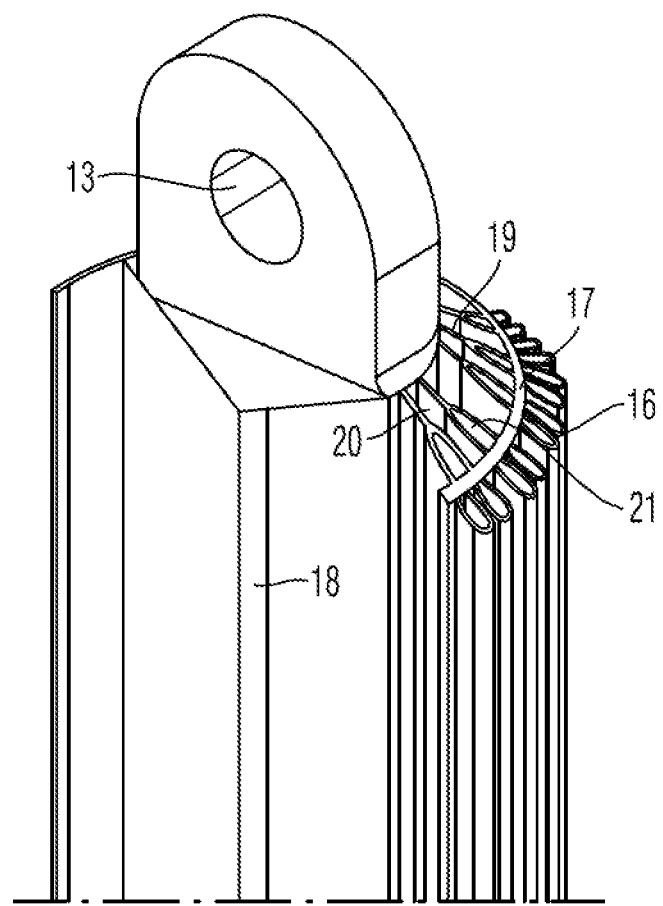

FIG. 4A, 4B, 4C show an exemplary embodiment of a load bearing element 1 according to an aspect of the present invention. In the shown embodiment, the integrally manufactured body 6 is a longitudinal body having the form of a cylinder as illustrated in FIG. 4A with a length L. The upper end of the longitudinal body 6 does comprise a standard lug 13 for connecting a load, in particular a heat generating unit load 2 by means of a bolt. At the lower end, the cylindrical body 6 can stand on the heat sensitive supporting structure 3 by means of a leg element 14 held by a receiving element 15 of the flange 5 of the supporting structure 3. The flange 5 has a width W and a depth D.

FIG. 4B shows a detailed view on the upper end of the cylindrical body 6 having the bolt receiving lug 13. As can be seen in FIG. 4B, the cylindrical rod body 6 of the load bearing element 1 comprises longitudinal cooling channels 20, or cavities which allows a fluid F such as air to flow through the body 6 and to transfer thermal energy by convection. In the embodiment shown in FIGS. 4A, 4B, 4C, the convection through the cooling cavities or channels within the body 6 is natural convection. This convection stream cools the body 6 which transports heat originating from the heat generating unit 2 to the heat sensitive supporting structure 3, thus reducing the thermal energy reaching the heat sensitive supporting structure 3.

FIG. 4C shows the provision of additional cooling ribs or cooling tubes 16 attached to an outer circumferential ring 17 of the cylindrical body 6. The additive layer manufacturing, ALM, process allows to increase the outer shape of the body by adding the additional outer cooling ribs or cooling tubes 16. As can be seen in FIG. 4C, the integrally manufactured body 6 of the load bearing element 1 can be formed by a longitudinal core strut 18 connected to the cylindrical circumferential ring 17 via branching structures 19 providing longitudinal cooling cavities within the body 6. The integrally manufactured longitudinal body 6 further comprises the cooling tubes 16 attached to the circumferential ring 17 so that a cooling fluid F can move along and within the cooling tubes 16 in a vertical direction to cool its surface.

Figure 5A:
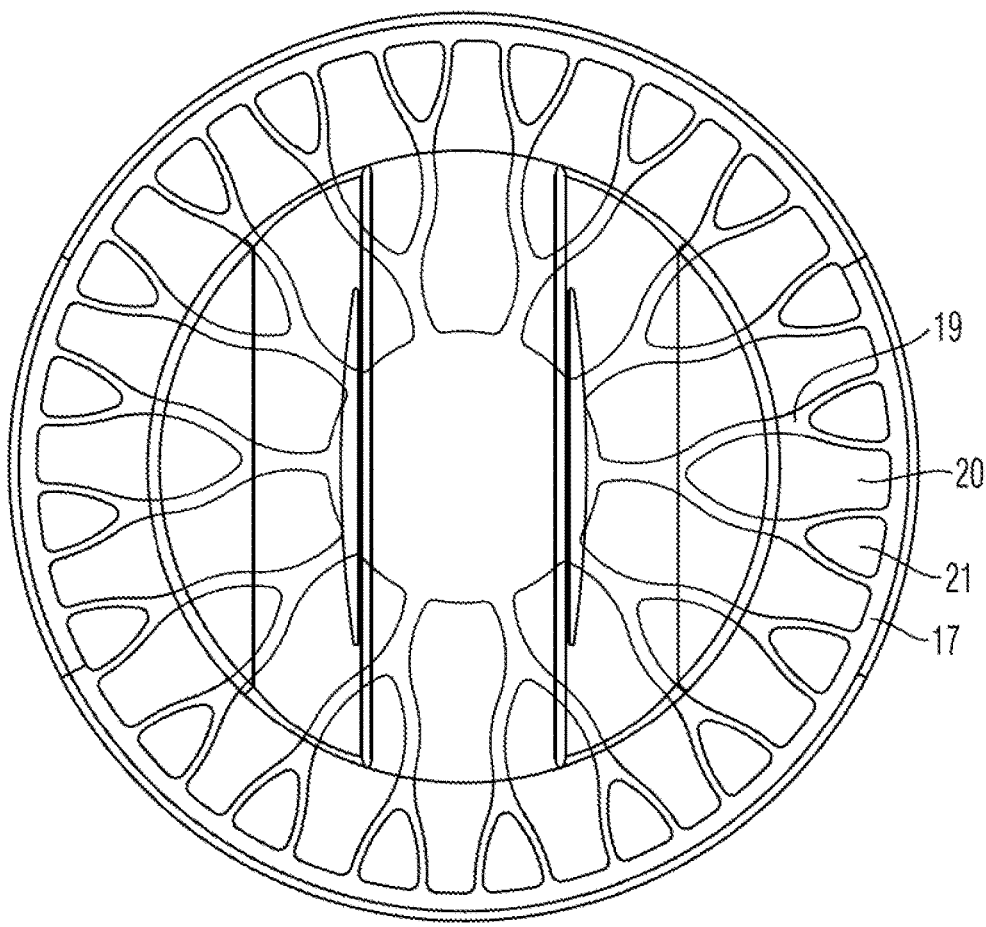
FIGS. 5A, 5B illustrate a further possible embodiment of a load bearing element according to an aspect of the present invention.
Figure 5B:
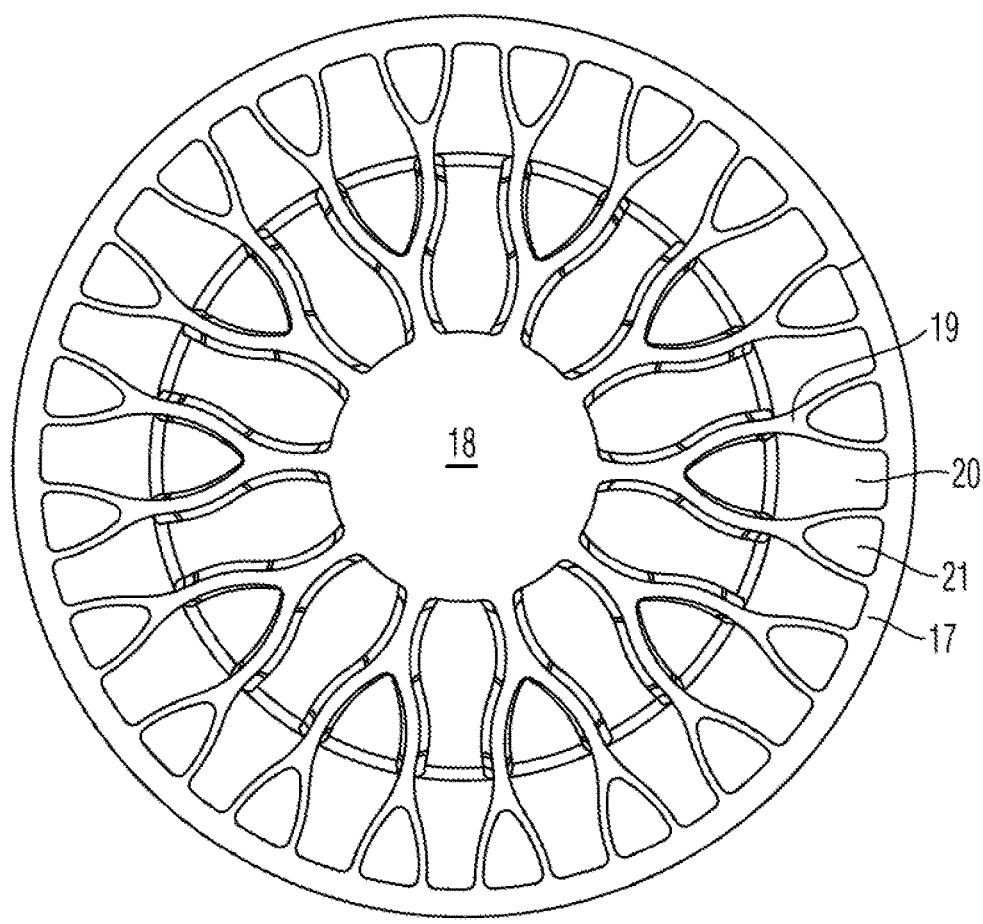

FIGS. 5A, 5B illustrate a top view and a cross-section view through an integrally manufactured body 6 in a possible embodiment of a load bearing element 1. As can be seen in the cross-section view in FIG. 5B, the body 6 comprises in the shown embodiment a longitudinal core 18 connected to the cylindrical circumferential ring 17 via branches 19 providing longitudinal cooling cavities or cooling channels 20, 21 as illustrated in FIG. 5B. FIG. 5A shows a top view showing that the longitudinal cylindrical body 6 is covered by an eye element only partially so that a fluid F can flow from the bottom of the longitudinal cylindrical body 6 to the top of the body 6 through the channels 20, 21. The branches 19 do not only provide the longitudinal cooling channels 20, 21, but also provide a high mechanical bending stiffness of the body 6. Moreover, the branches 19 guarantee a high bending stiffness of the body 6 with a very low weight. Since the branches 19 are comparatively thin, as illustrated in FIG. 6B, the mass and weight of the body 6 is reduced significantly. This has the advantage that the load bearing element 1 when built in a flying vehicle such as an aircraft has a low weight, thus reducing the fuel consumption of the flying vehicle. Further, through the reduced mass of the body 6, the energy flow between both mechanical interfaces at the upper and lower end of the body 6 is diminished.

The form of the integrally manufactured body 6, in particular the number, size and thickness of the branches 19, can be adapted to the respective application and in particular to the amount of thermal energy generated by the heat generating unit 2 and transported through the body 6 to the heat sensitive supporting structure 3.

Figure 6:
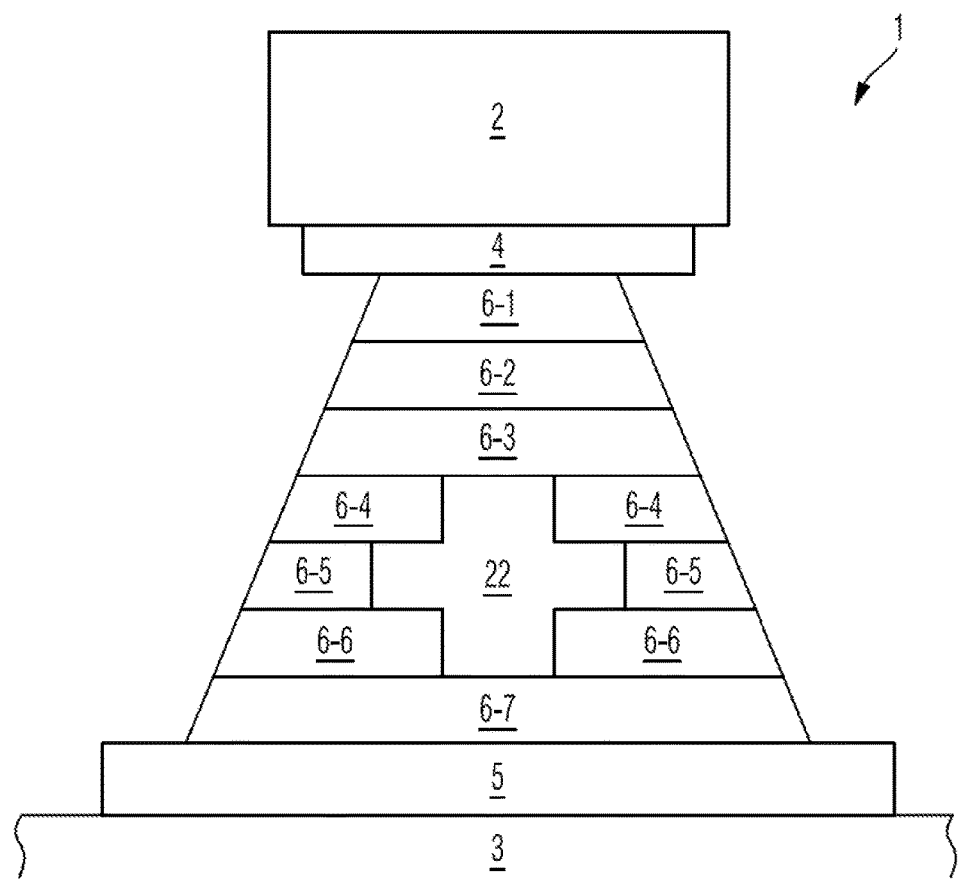
FIG. 6 illustrates a further possible embodiment of a load bearing element according to an aspect of the present invention.

FIG. 6 shows a schematic diagram for illustrating a possible embodiment of a load bearing element 1 according to an aspect of the present invention. In the shown schematic diagram, the body 6 consists of a plurality of layers 6-1 to 6-7. In the shown embodiment, the top layer 6-1 is positioned at the side of the heat generating unit 2 and the lowest layer 6-7 is positioned at the side of the heat sensitive supporting structure 3. By using the ALM process, it is possible to form cavities such as cavity 22 illustrated in FIG. 6. The different layers 6-1, 6-2 . . . 6-7 of the integrally manufactured body 6 of the load bearing element 1 can be printed from the same or different fire resistant materials in particular metals or metal alloys. The printed layers of the integrally manufactured body 6 have different heat transport properties or other physical properties depending on the position of the respective printed layer 6-i relative to the heat generating unit 2 attached by the load bearing element 1 to the heat sensitive supporting structure 3. In a possible embodiment, the upper layers of the integrally manufactured body 6 located close to the heat impacted side in the vicinity of the heat generating unit 2 can comprise a lower thermal conductivity than the layers at the bottom located close to the heat sensitive supporting structure 3. Some layers 6-i can comprise composite materials. It is also possible that layers 6-i comprise ceramic materials to control the thermal energy transfer through the body 6.

In a possible embodiment, the layers 6-i of the integrally manufactured body 6 located close to the heat impacted side in the vicinity of the heat generating unit 2 can provide a higher radiation shielding capability than the layers located close to the heat sensitive supporting structure 3. Accordingly, the layers 6-1, 6-2, 6-3, 6-4, 6-5, 6-6, 6-7 can be printed from different fire resistant materials and can provide different heat transport properties depending on their position within the body 6. The different printed layers 6-i of the integrally manufactured body 6 can also have other differing physical properties, in particular they can have different physical densities. For instance, some layers 6-i can be porous, whereas other layers are solid. Depending on the used material, one or several layers can also have shock-absorbing and/or elastic properties to absorb physical shocks or forces caused by the carried load 2. The materials are preferably fire- and/or heat-resistant materials. For instance, when the heat generating unit 2 comprises a high weight and is accelerated by a flying manoeuvre of a flying vehicle, one or several layers 6-i can be adapted to absorb the resulting mechanical forces due to elastic properties.

Figure 7:
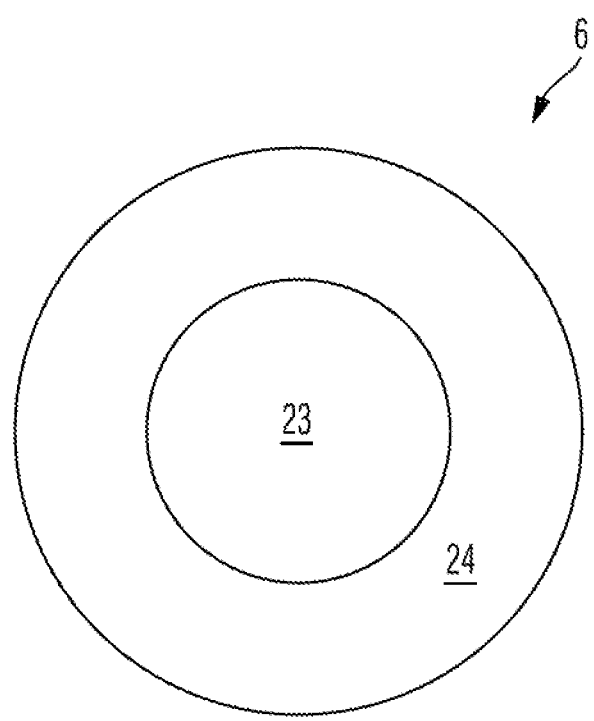
FIG. 7 shows a schematic diagram for illustrating a possible embodiment of the load bearing element according to an aspect of the present invention.

FIG. 7 shows a further exemplary embodiment of a load bearing element 1 according to an aspect of the present invention. In this embodiment, the integrally manufactured body 6 of the load bearing element 1 is a longitudinal body comprising a longitudinal core strut 23 surrounded by a porous cladding 24 adapted to shield the core strut 23 from external heat or fire. The porous cladding forming a shield can comprise a metal foam which can be manufactured by additive layer manufacturing ALM. In a possible embodiment, the inner load carrying strut 23 and/or the outer cladding 24 can be formed by a corrosion resistant material, for instance nickel, steel or titanium, and having a relatively low heat transfer capability. For instance, titanium can comprise a heat transfer capability of 22 W/Km whereas austenitic CrNi-steel alloys have a heat transfer capability of only 15 W/Km.

In a possible embodiment, the outer shielding cladding 24 can be formed according to a bionic design data model similar to bone spongiosa. The form of the body 6 of the embodiment shown in FIGS. 5A, 5B does comprise a bionic design similar to a grant water lily. The bionic design provides a continuous strain without concentrations of mechanical stress within sections of the body 6.

The invention further provides according to a further aspect a method for manufacturing a body of a load bearing element 1, wherein its body 6 is integrally formed by additive layer manufacturing, ALM, such that it provides a controlled heat transfer from a heat generating unit 2 such as an auxiliary power unit APU carried by the load bearing element 1 to a heat sensitive supporting structure 3 to which said heat generating unit 2 is attached. Different ALM technologies can be used including wire-freeform fabrication, extrusion deposition, granular materials binding, lamination, extrusion, fused deposition modelling, direct metal laser melting, electron beam melting and/or selective laser melting.

The load bearing element 1 according to an aspect can comprise one or several bodies formed by additive layer manufacturing, ALM. The load bearing element 1 according to an aspect of the present invention can be used in many applications, in particular for attaching a heat generating unit 2 carried by the load bearing element 1 to a heat sensitive supporting structure 3, e.g. a fuselage or chassis of a vehicle. The load can be carried by the load bearing element 1 or can alternatively be hanging at the load bearing element 1. In a possible embodiment, the body 6 of the load bearing element 1 is formed such that the surface of the heat impacted side is reduced so that the surface of the heat impacted side is shielded from thermal radiation. In a preferred embodiment, the body 6 is formed such that the load path and the path of heat flow are decoupled. In a preferred embodiment, the heat received from the heat generating unit 2 is spread by the body 6 to a wider surface so that the heat sensitive supporting structure 3 can maintain its mechanical stiffness at all operation conditions. The body 6 further provides heat removal, for instance by natural or forced convection. Moreover, the heat removal can be improved by additional cooling ribs and/or cooling tubes. In a possible embodiment, the layers of the body 6 formed by additive layer manufacturing ALM use materials with an adapted heat conduction property to provide a controlled fitting heat transfer. In a possible embodiment, the load bearing element 1 is a bracket for connecting an APU 2 to a fuselage 3 of a flying vehicle, wherein the bracket can be shielded and sealed by a bellow. The APU bracket acts as a heat bridge to the fuselage skin.

The load bearing element 1 comprising the integrally manufactured body 6 can act as a heat bridge between the heat generating unit 2 and the heat sensitive supporting structure 2 providing a controlled heat transfer, wherein the cross-section, length, material and arrangement of the manufactured layers 6-$i$ of the body 6 define a temperature on a skin of the heat sensitive supporting structure 3, in particular the fuselage skin of an aircraft fuselage.

Figure 8A:
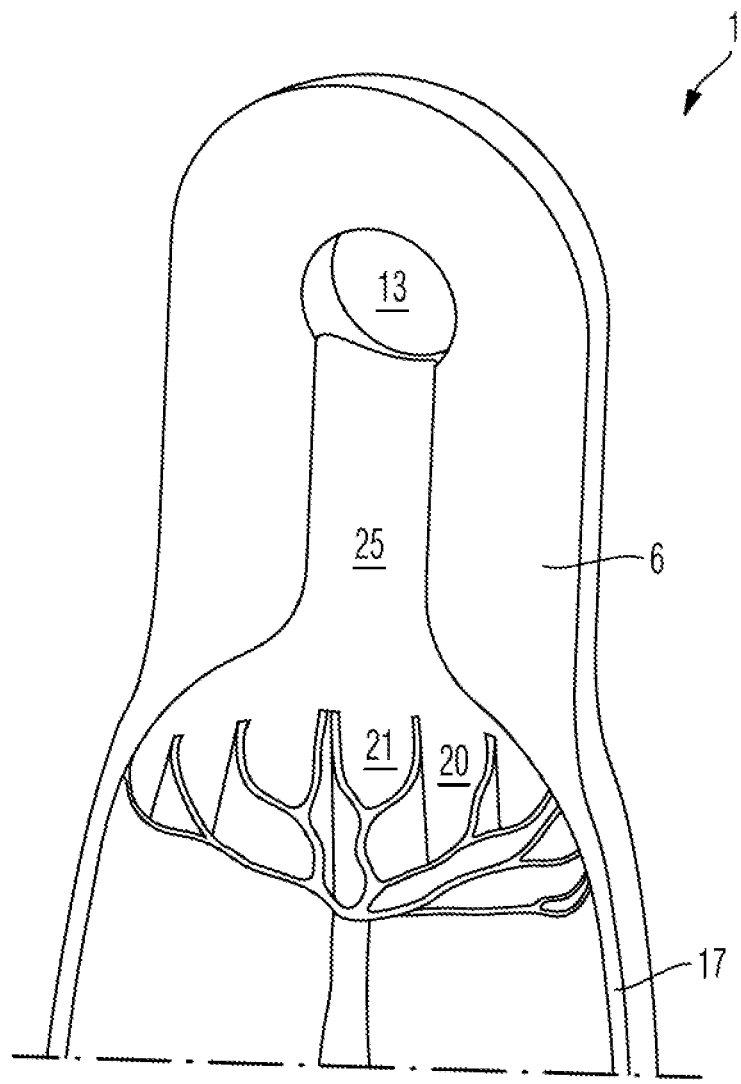
FIGS. 8A, 8B, 8C illustrate a further exemplary embodiment of a load bearing element according to an aspect of the present invention.
Figure 8B:
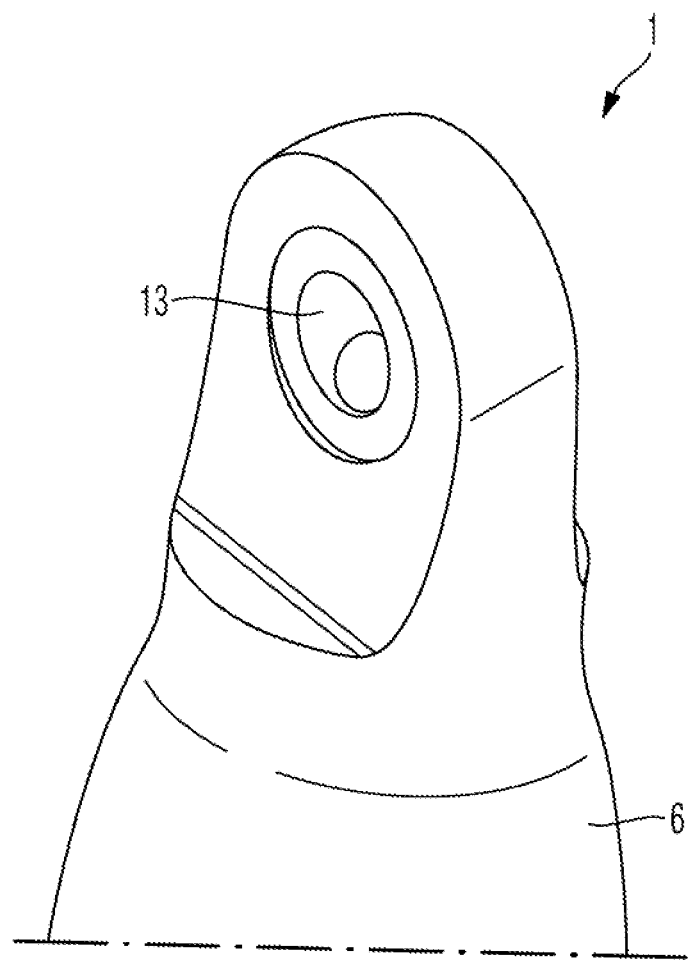
Figure 8C:
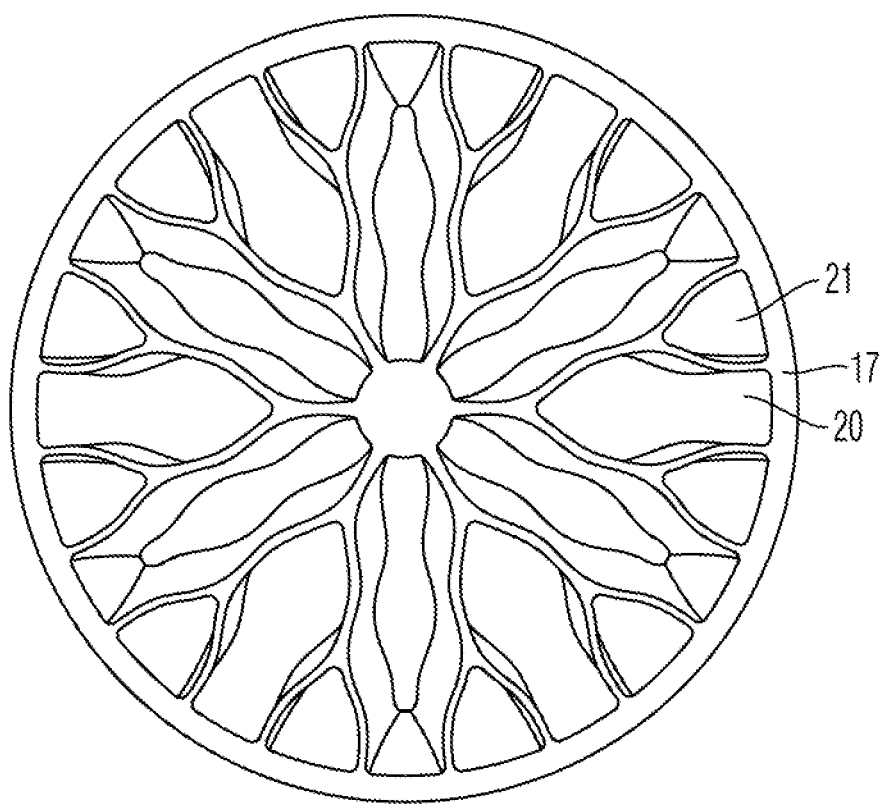

FIGS. 8A, 8B, 8C show a further exemplary embodiment of a load bearing element 1 according to the present invention having a integrally manufactured body 6 which is closed with the exception of an outlet channel 25 transporting a fluid streaming through channels or cavities 20, 21 to the bolt receiving lug 13. FIG. 8A is a longitudinal cross section view through the body 6. FIG. 8B shows a perspective view on the upper section of the body 6. FIG. 8C is a further cross section view through the body 6 perpendicular to its longitudinal axis.

The invention claimed is:

1. A combination of a heat generating unit, a heat sensitive supporting structure and a load bearing element for attachment of the heat generating unit to the heat sensitive supporting structure, wherein said load bearing element comprises:
   at least one body integrally formed by additive layer manufacturing (ALM), said body being adapted to provide a controlled heat transfer from said heat generating unit to said heat sensitive supporting structure, said at least one body including an outer conical body with a base of the outer conical body connected to the heat sensitive supporting structure and an apex of the conical body connected to the heat generating unit and an inner conical body with a base of the inner conical body connected to the outer conical body and an apex of the inner conical body connected to the heat sensitive supporting structure,
   wherein the integrally manufactured body of said load bearing element is a load bearing bracket for attachment of the heat generating unit to said heat sensitive supporting structure being a fuselage of a flying vehicle,
   wherein said integrally manufactured body of said load bearing element comprises several layers printed from the same or different fire proof materials, and
   wherein the at least one body comprises a plurality of ventilation holes configured to allow a fluid to enter and to leave internal cavities of the outer conical body and the inner conical body.

2. The combination according to claim 1, wherein the integrally manufactured body of said load bearing element is formed such that
   the integrally manufactured body is configured to shield the heat sensitive supporting structure from thermal radiation emitted directly or indirectly by said heat generating unit, and/or that
   the integrally manufactured body is configured to transfer thermal energy received from said heat generating unit by a fluid moving by convection through cooling cavities and/or along cooling ribs of said integrally manufactured body to the surrounding, and/or that
   the integrally manufactured body is configured to spread the thermal energy received from said heat generating unit by thermal conduction via said integrally manufactured body to a footprint area,
   where the load bearing element is attached to said heat sensitive supporting structure.

3. The combination according to claim 1, wherein the integrally manufactured body of said load bearing element is formed such that by the controlled heat transfer a mechanical stiffness throughout said integrally manufactured body of said load bearing element and/or a mechanical stiffness of said heat sensitive supporting structure is maintained for a load less than an admissible maximum load, carried by said load bearing element and/or a thermal energy less than a maximum thermal energy generated by said heat generating unit and/or is formed such that the integrally manufactured body at least partially absorbs mechanical forces.

4. The combination according to claim 1, wherein the printed layers of the integrally manufactured body of the load bearing element have different heat transport properties or other physical properties, depending on the position of the respective printed layers relative to the heat generating unit attached by said load bearing element to said heat sensitive supporting structure.

5. The combination according to claim 4, wherein layers of said integrally manufactured body located proximal said heat generating unit comprise at least first thermal conductivity lower than an at least second thermal conductivity of layers located proximal the heat sensitive supporting structure.

6. The combination according to claim 4, wherein layers of the integrally manufactured body proximal said heat generating unit provide an at least first radiation shielding higher than an at least second radiation shielding of layers located proximal the heat sensitive supporting structure.

7. The combination according to claim 1, wherein a cross-section through said integrally manufactured body of said load bearing element parallel to said heat sensitive supporting structure increases towards the heat sensitive supporting structure to spread the thermal energy received from said heat generating unit to an extended footprint area, where the load bearing element is attached to said heat sensitive supporting structure.

8. The combination according to claim 1, wherein the integrally manufactured body of the load bearing element comprises a three-dimensional structure printed by additive layer manufacturing (ALM) according to a three-dimensional bionic design data model read from a database.

9. The combination according to claim 1, wherein the heat generating unit is an auxiliary power unit (APU) mounted in a fire compartment of a flying vehicle or of a land vehicle.

10. A vehicle comprising at least one combination according to claim 1.

* * * * *